(12) United States Patent
Seok et al.

(10) Patent No.: US 11,665,588 B2
(45) Date of Patent: May 30, 2023

(54) EXTENDED SEQUENCE CONTROL FOR FRAGMENTED FRAMES IN WLAN

(71) Applicant: MediaTek Singapore Pte. Ltd., Singapore (SG)

(72) Inventors: Yongho Seok, San Jose, CA (US); Kai Ying Lu, San Jose, CA (US); James Chih-Shi Yee, San Jose, CA (US)

(73) Assignee: MEDIATEK SINGAPORE PTE. LTD, Singapore (SG)

( * ) Notice: Subject to any disclaimer, the term of this patent is extended or adjusted under 35 U.S.C. 154(b) by 9 days.

(21) Appl. No.: 17/137,236

(22) Filed: Dec. 29, 2020

(65) Prior Publication Data

US 2021/0211931 A1    Jul. 8, 2021

Related U.S. Application Data

(60) Provisional application No. 62/957,948, filed on Jan. 7, 2020.

(51) Int. Cl.
| | |
|---|---|
| *H04W 28/06* | (2009.01) |
| *H04W 80/02* | (2009.01) |
| *H04W 84/12* | (2009.01) |
| *H04L 69/22* | (2022.01) |

(52) U.S. Cl.
CPC ............ *H04W 28/06* (2013.01); *H04L 69/22* (2013.01); *H04W 80/02* (2013.01); *H04W 84/12* (2013.01)

(58) Field of Classification Search
CPC ..... H04W 28/06; H04W 84/12; H04W 80/02; H04L 69/22
See application file for complete search history.

(56) References Cited

U.S. PATENT DOCUMENTS

| | | | | |
|---|---|---|---|---|
| 9,998,808 | B2 * | 6/2018 | Kim | H04L 45/26 |
| 10,476,693 | B2 * | 11/2019 | Lee | H04L 65/70 |
| 2016/0056886 | A1 * | 2/2016 | Kitamura | H04L 47/34 |
| | | | | 398/19 |
| 2016/0147814 | A1 * | 5/2016 | Goel | G06F 16/27 |
| | | | | 707/638 |
| 2017/0070914 | A1 * | 3/2017 | Chun | H04L 1/0618 |
| 2017/0273039 | A1 * | 9/2017 | Adachi | H04W 56/001 |
| 2018/0006749 | A1 * | 1/2018 | Oh | H04N 21/2381 |
| 2018/0249365 | A1 * | 8/2018 | Cho | H04W 28/04 |
| 2018/0317128 | A1 * | 11/2018 | Chun | H04B 7/26 |
| 2020/0145145 | A1 * | 5/2020 | Chu | H04L 5/0044 |

* cited by examiner

*Primary Examiner* — Syed Ali

(57) ABSTRACT

Embodiments of the present invention transmit fragmented frames using a sequence control field in a MAC header that includes an extended 15-bit sequence number for tracking the order of frames, and a 1-bit PF field that indicates the position of a fragmented frame in conjunction with a 1-bit MF field carried in a frame control subfield of the MAC header. The fragmented frames can be received by a wireless device and defragmented according to the MF field, the PF field, and the sequence control number. The frames can be discarded if any are not received successfully.

12 Claims, 11 Drawing Sheets

EXTENDED SEQUENCE CONTROL FOR FRAGMENTED FRAMES IN WLAN

CROSS-REFERENCE TO RELATED APPLICATIONS

This application claims the benefit of and priority to provisional patent application Ser. No. 62/957,948, with filing date Jan. 7, 2020, which is hereby incorporated by reference in its entirety.

FIELD

Embodiments of the present invention generally relate to the field of wireless communications. More specifically, embodiments of the present invention relate to systems and methods for transmitting and receiving sequence control information in a wireless system.

BACKGROUND

Modern electronic devices typically send and receive data with other electronic devices wirelessly e.g., using Wi-Fi technology that includes transmitting sequence control information identifying sequences of frames, for example, fragmented MSDUs. Received frames are acknowledged, for example, using block acknowledgment (block ACK) bitmaps that include bits indicating successfully received frames or frames received with error.

Existing approaches to Wi-Fi communication defined in IEEE 802.11ax and IEEE 802.11ay limit the window size for transmission to 256 MPDUs and 1K MPDUs, respectively. The maximum block ack bitmap size for acknowledging MAC Service Data Units (MSUDs) is 256 under 802.11ax and up to 1K under 802.11 ay. To support the next generation of wireless devices, the maximum window size and the maximum number of MSDUs that can be acknowledged both need to be much higher, so that many more MSDUs can be sent in a transmission window before receiving acknowledgment thereby increasing the performance of the network.

Currently the maximum window size for transmitting MPDUs is limited by the use of a 12-bit Sequence Control Field (legacy Sequence Control Field). What is needed is an approach to frame sequence control that is not limited as described above.

SUMMARY

What is needed is an approach to frame sequence control that extends the size of the Sequence Control Field to extend the maximum window size and thereby improve the performance of the wireless network. Accordingly, embodiments of the present invention provide techniques for transmitting fragmented frames using a sequence control field in a MAC header that includes an extended 15-bit sequence number for tracking the order of frames, and a 1-bit PF field that indicates the position of a fragmented frame in conjunction with a 1-bit MF field carried in a frame control subfield of the MAC header. The fragmented frames can be received by a wireless device and defragmented according to the MF field, the PF field, and the sequence control number. The frames can be discarded if any are not received successfully.

According to one embodiment, a method of wirelessly transmitting fragmented frames by a transmitting device is disclosed. The method includes fragmenting a data frame into a plurality of fragmented frames, the plurality of frames including a first fragmented frame, a middle fragmented frame, and a last fragmented frame, setting a preceding fragments (PF) bit and a more fragments (MF) bit of respective MAC headers of each fragmented frame of the plurality of fragmented frames to indicate a position of each fragmented frame, and transmitting the first fragmented frame, the middle fragmented frame, and the last fragmented frame and the MAC headers to a recipient wireless device.

According to some embodiments, the recipient wireless device defragments the plurality of fragmented frames, and where the PF bits and the MF bits are used to determine positions of respective fragmented frames. According to some embodiments, setting the PF bit to 1 indicates the existence of a preceding fragmented frame. According to some embodiments, setting the MF bit to 1 indicates the existence of a subsequent fragmented frame. According to some embodiments, setting both the PF bit to 1 and the MF bit to 1 indicates that the respective fragmented frame is a middle fragmented frame. According to some embodiments, the PF bit is carried in a sequence control field of the MAC header. According to some embodiments, the sequence control field further includes a 15-bit sequence number (SEQ) for identifying the respective fragmented frame. According to some embodiments, the MF bit is carried in a frame control field of the MAC header. According to some embodiments, the fragmented frames are defragmented at the recipient wireless device to produce an MSDU. According to some embodiments, the first fragmented frame, the middle fragmented frame, and the last fragmented frame are included in an A-MPDU. According to some embodiments, setting both the PF bit to 0 and the MF bit to 0 indicates that there are no fragmented frames.

According to another embodiment, an apparatus for wirelessly transmitting fragmented frames to a receiving device over a wireless network is disclosed. The apparatus includes a transceiver configured to wirelessly send and receive data over the wireless network, a memory for storing data frames, and a processor operable to access a data frame from the memory, fragment the data frame into a plurality of fragmented frames, the plurality of frames including a first fragmented frame, a middle fragmented frame, and a last fragmented frame, set a preceding fragments (PF) bit and more fragments (MF) bit of respective MAC headers of each fragmented frame of the plurality of fragmented frames to indicate a position of each fragmented frame, and cause the transceiver to wirelessly transmit the first fragmented frame, the middle fragmented frame, and the last fragmented frame and the MAC headers to a recipient wireless device.

According to another embodiment, a method of defragmenting a fragmented MSDU in a wireless network is disclosed. The method includes receiving a plurality of fragmented frames over the wireless network, the plurality of fragmented frames including a first fragmented frame, a middle fragmented frame, and a last fragmented frame, accessing MAC headers of the respective fragmented frames to determine a preceding frames (PF) bit and a more frames (MF) bit, where the PF bit is carried in a sequence control field of the MAC headers, and defragmenting the fragmented frames according to the PF bit and MF bit values, where the PF bit and MF bit values indicate a position of a respective fragmented frame of the plurality of fragmented frames.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
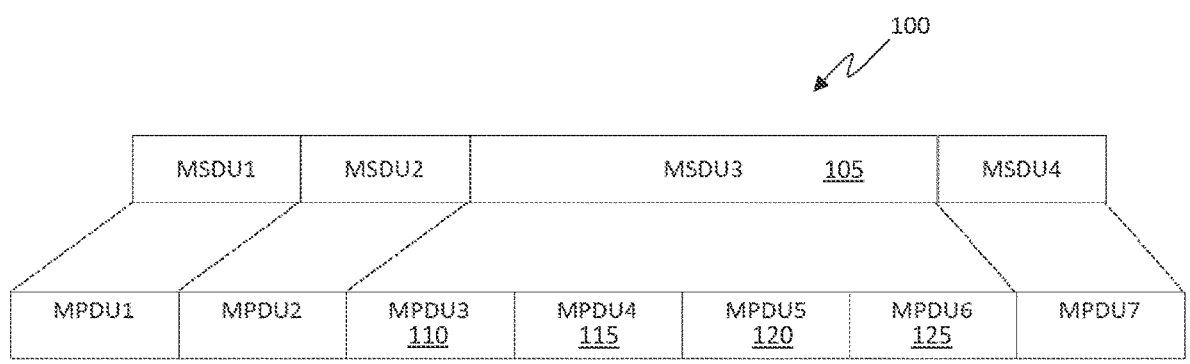
FIG. 1 is a block diagram of an exemplary wireless transmission including an MPDU transmitted as fragmented MSDUs.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 9-10) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "setting," "storing," "transmitting," "retransmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Extended Sequence Control for Fragmented Frames in WLAN

As used herein, the term "EHT" refers generally to a recent generation of wireless communication (Wi-Fi) known as Extremely High Throughput (EHT) and is defined according to the IEEE 802.11be standards. The term station (STA) refers generally to an electronic device capable of sending and receiving data over Wi-Fi that is not operating as an access point (AP).

Embodiments of the present invention provide techniques and systems for transmitting fragmented frames using a sequence control field in a MAC header that includes an extended 15-bit sequence number for tracking the order of frames, and a 1-bit PF field that indicates the position of a fragmented frame in conjunction with a 1-bit MF field carried in a frame control subfield of the MAC header. The fragmented frames can be received by a wireless device and defragmented according to the MF field, the PF field, and the sequence control number. The frames can be discarded if any are not received successfully.

FIG. 1 depicts an exemplary Aggregate (A) MAC protocol data unit (MPDU) (A-MPDU) 100 containing four MSDUs, including MSDU 105 fragmented into MPDU3 110, MPDU4 115, MPDU5 120, and MPDU6 125. Under existing standards, such as IEEE 802.11ax and IEEE 802.11ay, the available window size for transmission is 256 MPDUs and 1K MPDUs, respectively. Moreover, the maximum block ack bitmap size for acknowledging MSDUs is 256 in 802.11ax and up to 1K in 802.11 ay, thereby limiting the size of A-MPDU 100 an limiting the overall wireless performance of the wireless network.

Upcoming generations of wireless technology, such as IEEE 802.11be EHT PHY support 320 MHz bandwidth, 16 spatial streams, 1024 QAM, and multi-link aggregation. In order to fully utilize the increased PHY rates, it is important to improve the MAC efficiency using an extended sequence control scheme, for example. The Max PHY Peak Rate in IEEE 802.11be is roughly 48,000 Mbps. To support this emerging wireless technology, the MAC layer extends the maximum window size to at least 1K, and supports Block Ack Bitmap sizes of at least 512 and 1K. In some cases, extending the maximum window size to more than 2K may be needed for multi-link operations that use more than 2 links of 320 MHz and 16 spatial streams.

Embodiments of the present invention provide an extended sequence control scheme for fragmented frames that advantageously removes the 4-bit Fragment Number field of the legacy Sequence Control field so that the Sequence Number space can be advantageously extended from 12 bits (4K) to 15 bits (32K). The remaining 1 bit is used to implement the Preceding Frames (PF) field in the extended Sequence Control field. In this way, the transmission window can be extended to more than 1K MPDUs, for example. According to some embodiments, up to 16K MPDUs can be wirelessly transmitted during a transmission window and the transmission can be acknowledged using a single block ack.

According to some embodiments, the use of the extended sequence control scheme is indicated in a block ack agreement. Without the block ack agreement, the extended Sequence Control field is not used in the transmission of the respective data frame. Once the block ack is agreed to, the extended Control Field may be provided in the Data frame of the TID of the block ack agreement.

In one example, a wireless device requests the use the extended Sequence Control field (rather than the legacy Sequence Control field) in an add block ack (ADDBA) Request frame having an extended Sequence Control Operation subfield in the ADDBA Capabilities field of the ADDBA Extension Element set to 1. The recipient wireless device confirms the request to use the extended Sequence Control field in the ADDBA Response frame in which the extended Sequence Control Operation subfield in the ADDBA Capabilities field in the ADDBA Extension Element is set to 1 to the requesting device. After establishing the block ack agreement and enabling the extended Sequence Control, the requesting device and recipient device can transmit data frame using the extended Sequence Control field. In other words, the extended Sequence Control field can be included in a subsequent frame (e.g., a data frame) and transmitted between the requesting device and recipient device over the wireless network.

Figure 2:
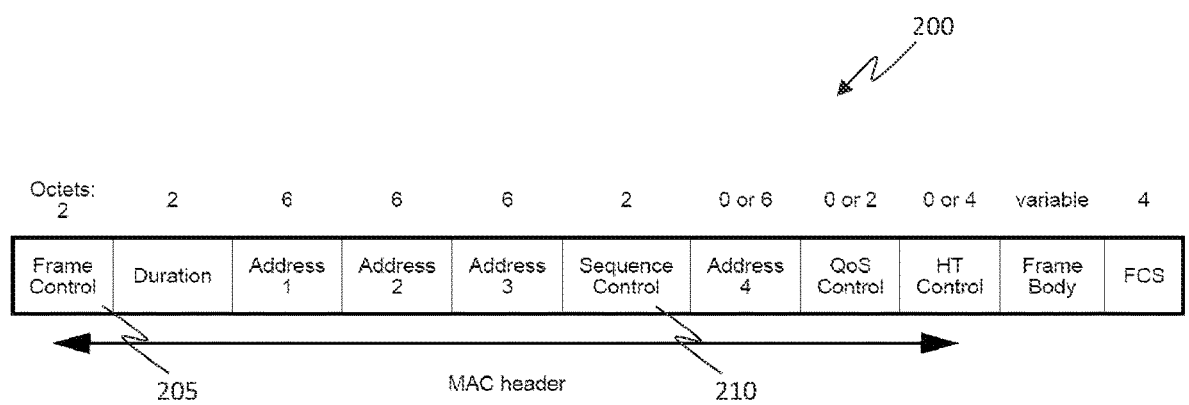
FIG. 2 is a block diagram of an exemplary MAC header for implementing an extended sequence control field according to embodiments of the present invention.

FIG. 2 depicts fields of an exemplary MAC header 200 of a data frame (e.g., an MSDU) using an extended Sequence Control field according to embodiments of the present invention. Frame Control field 205 includes More Fragments (MF) field 305 (FIG. 3), and Sequence Control field 210 includes Preceding fragments (PF) field 410 (FIG. 4) used in conjunction to indicate the position of a fragmented frame (or no fragmented frames), for example, according to the values listed in Table I. The order of frames can be determined using the Sequence Number subfield of Sequence Control field 210 (FIG. 4).

TABLE I

| Preceding Fragments (PF) | More Fragments (MF)| |                               |
| --- | --- | --- |
| 0 | 0 | Unfragmented MSDU |
| 0 | 1 | Fragmented MSDU (First fragment) |
| 1 | 1 | Fragmented MSDU (Middle fragment) |
| 1 | 0 | Fragmented MSDU (Last fragment) |

As indicated in Table I, according to some embodiments, setting the PF field to 0 and the MF field to 0 indicates an unfragmented MSDU. Setting the PF field to 0 and the MF field to 1 indicates that the MSDU is the first fragment of a fragmented MSDU. Setting the PF field to 1 and the MF field to 1 indicates that the MSDU is a middle fragment of a fragmented MSDU. The MSDU can be any fragment of the MSDU that is not the first or the last fragment. Setting the PF field to 1 and the MF field to 0 indicates that the MSDU is the last fragment of a fragmented MSDU.

Figure 3:
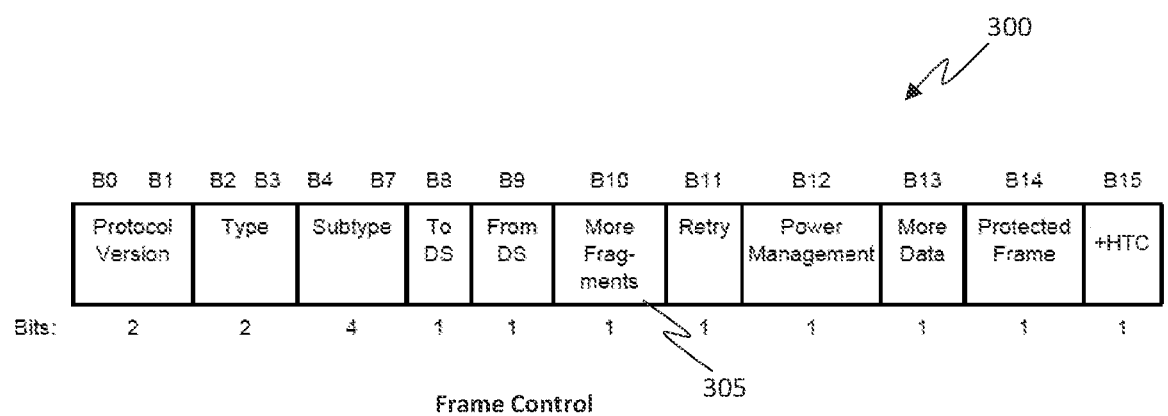
FIG. 3 is a block diagram of an exemplary frame control field for implementing an extended sequence control field according to embodiments of the present invention.
Figure 4:
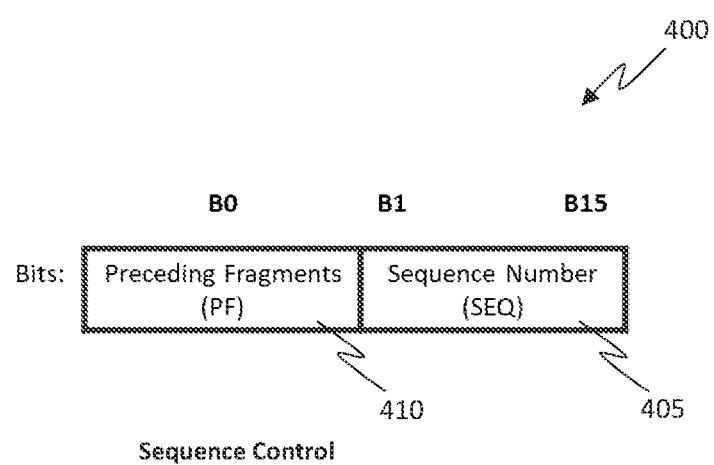
FIG. 4 is a block diagram of an exemplary sequence control field for implementing an extended sequence control field according to embodiments of the present invention.

FIG. 3 depicts an exemplary Frame Control field 300 of a MAC header (e.g., of a data frame) for implementing an extended Sequence Control field according to embodiments of the present invention. The Frame Control field includes a More Fragments (MF) field 305 for indicating the existence and position of a fragmented frame in conjunction with PF field 410 (see Table 1).

FIG. 4 depicts an exemplary Sequence Control field 400 of a MAC header (e.g., of a data frame) for implementing an extended Sequence Control field according to embodiments of the present invention. The Sequence Number (SEQ) field 405 indicates the unique sequence number of a frame, and Preceding Fragments (PF) field 410 indicates the existence and position of a fragmented frame in conjunction with MF field 305 (see Table I). The SEQ field 405 typically includes a unique value that is incremented for each subsequent frame and can be used to determine the order of received frames.

Figure 5:
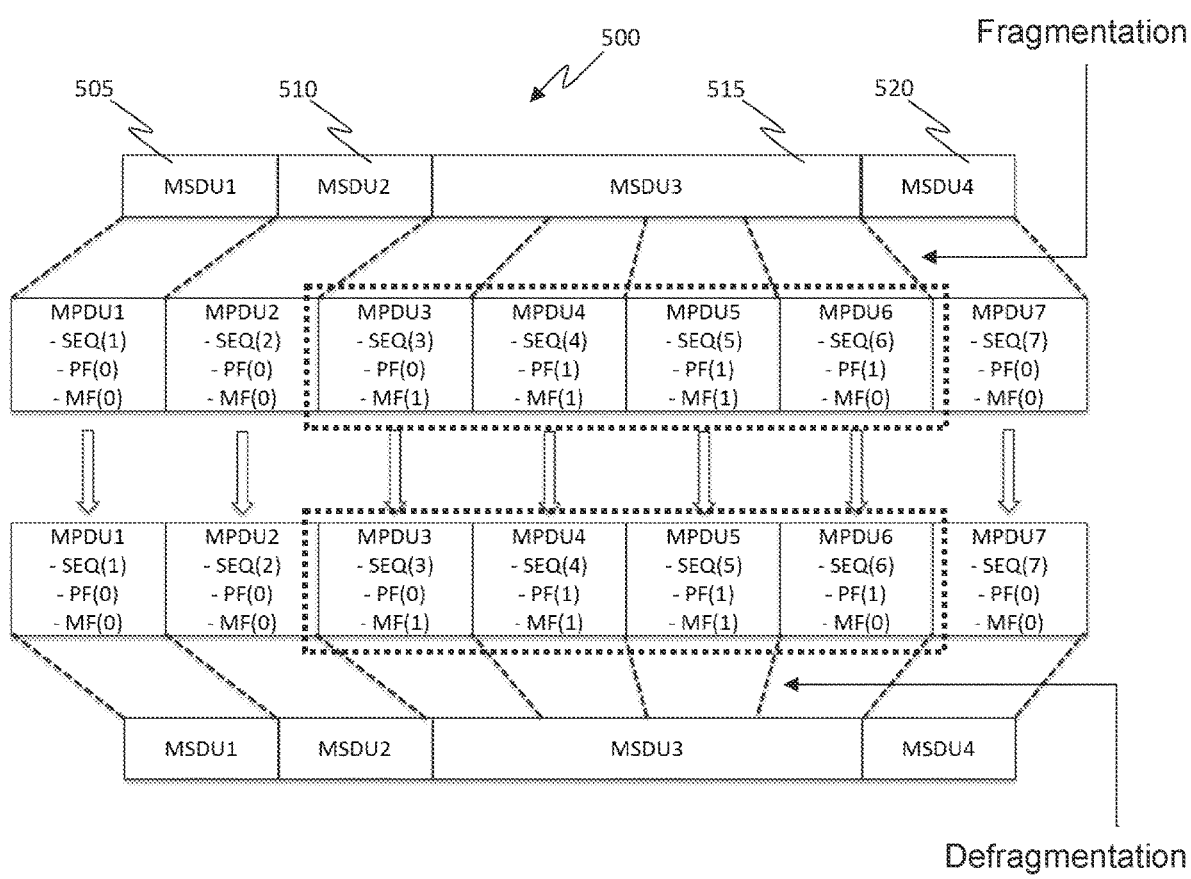
FIG. 5 is a block diagram of an exemplary wireless transmission using an extended sequence control field to identify fragmented frames of fragmented MSDUs and positions thereof according to embodiments of the present invention.

FIG. 5 depicts an exemplary wireless transmission including fragmented MSDU transmitted using an extended Sequence Control field according to embodiments of the present invention. In the example of FIG. 5, MSDU1 505 is carried in MPDU1 having SEQ(1), MF(0) PF(0), MSDU2 is carried in MPDU2 510 having SEQ(2) MF(0) PF(0), MSDU3 515 is fragmented and is carried in MPDU3, MPDU4, MPDU5, and MPDU6. MPDU3 has SEQ(3), MF(1) PF(0), MPDU4 has SEQ(4) MF(1) PF(1), MPDU5 has SEQ(5) MF(1) PF(1), and MPDU6 has SEQ(6) MF(0) PF(1). MSDU4 520 is carried in MPDU7 having SEQ(7) MF(0) PF(0).

An EHT wireless STA transmits MPDU1, MPDU2, MPDU3, MPDU4, MPDU5, MPDU6, and MPDU7 to the peer EHT STA. The MPDUs can be aggregated into an A-MPDU for transmission, for example. The peer EHT STA that receives the frames can defragment the fragmented MSDUs based on the PF field and the MF field (MF) values. The order of the fragmentation can further be determined by the Sequence Number subfield which contains a unique value for each MSDU. When the first fragment, the last fragment and all middle fragments are correctly received, the peer EHT wireless STA defragments the fragmented MSDUs to produce the MPDUs. Otherwise, all fragments are discarded. The peer EHT wireless STA can transmit an acknowledgment (e.g., block ack) indicating correctly received frames.

Figure 6:
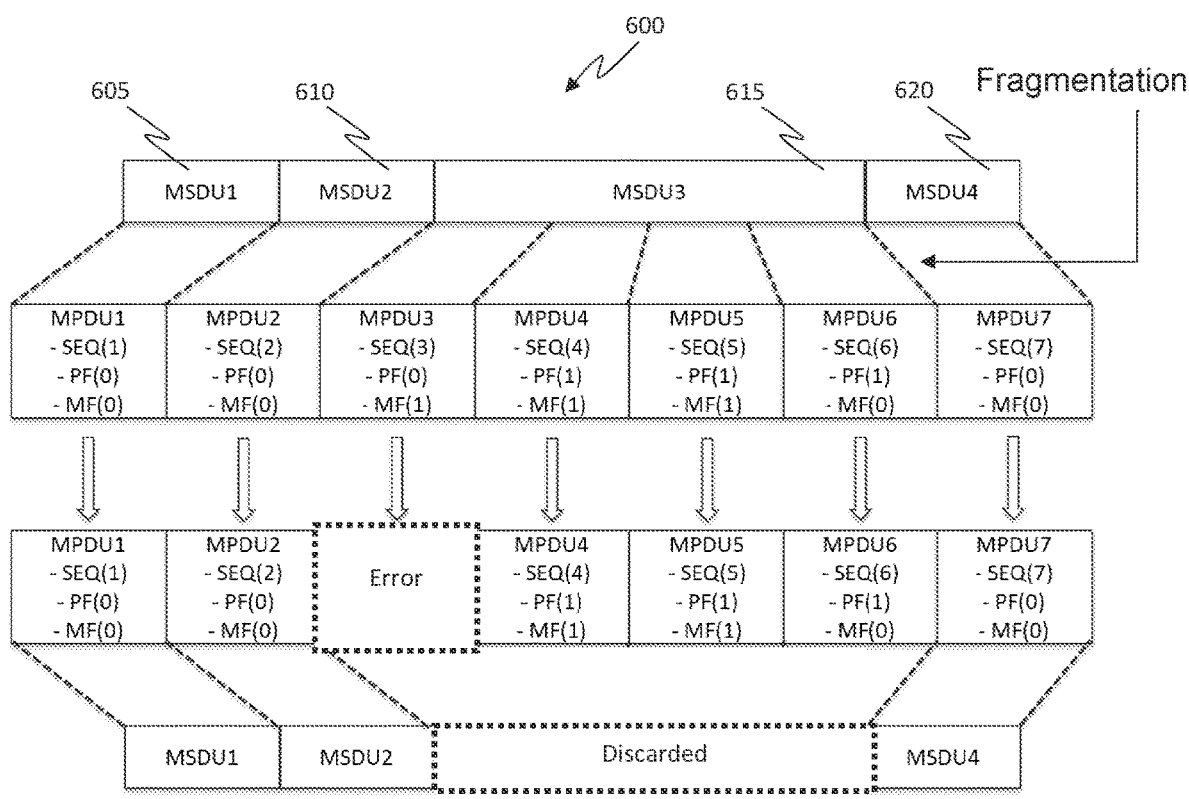
FIG. 6 is a block diagram of an exemplary wireless transmission using an extended sequence control field to identify fragmented frames of fragmented MSDUs and positions thereof where a first fragmented frame is received with error according to embodiments of the present invention.

In the example of FIG. 6, MSDU1 605, MSDU2 610, MSDU3 615, and MSDU4 620 are transmitted from an EHT wireless STA to a peer EHT wireless STA. MSDU3 615 is fragmented and carried in MPDU3, MPDU4, MPDU5, and MPDU6. The peer EHT wireless device cannot defragment MSDU3 615 because the first fragmented frame (MPDU3) is not successfully received. Accordingly, all fragments of MSDU3 are discarded by the peer EHT wireless STA.

Figure 7:
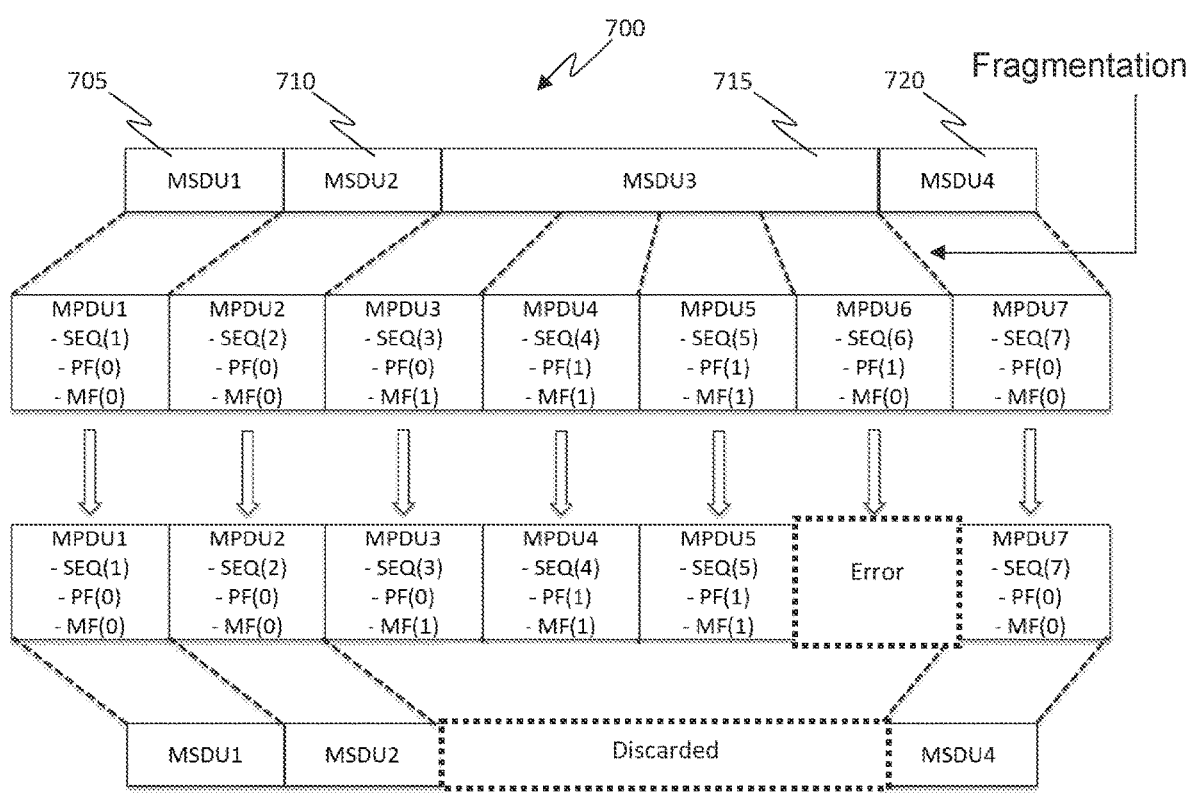
FIG. 7 is a block diagram of an exemplary wireless transmission using an extended sequence control field to identify fragmented frames of fragmented MSDUs and positions thereof where a final fragmented frame is received with error according to embodiments of the present invention.

In the example of FIG. 7, MSDU1 705, MSDU2 710, MSDU3 715, and MSDU4 720 are transmitted from an EHT wireless STA to a peer EHT wireless STA. MSDU3 715 is fragmented and carried in MPDU3, MPDU4, MPDU5, and MPDU6. The peer EHT wireless device cannot defragment MSDU3 715 because the last fragmented frame (MPDU6) is not successfully received. Accordingly, all fragments of MSDU3 are discarded by the peer EHT wireless STA.

Figure 8:
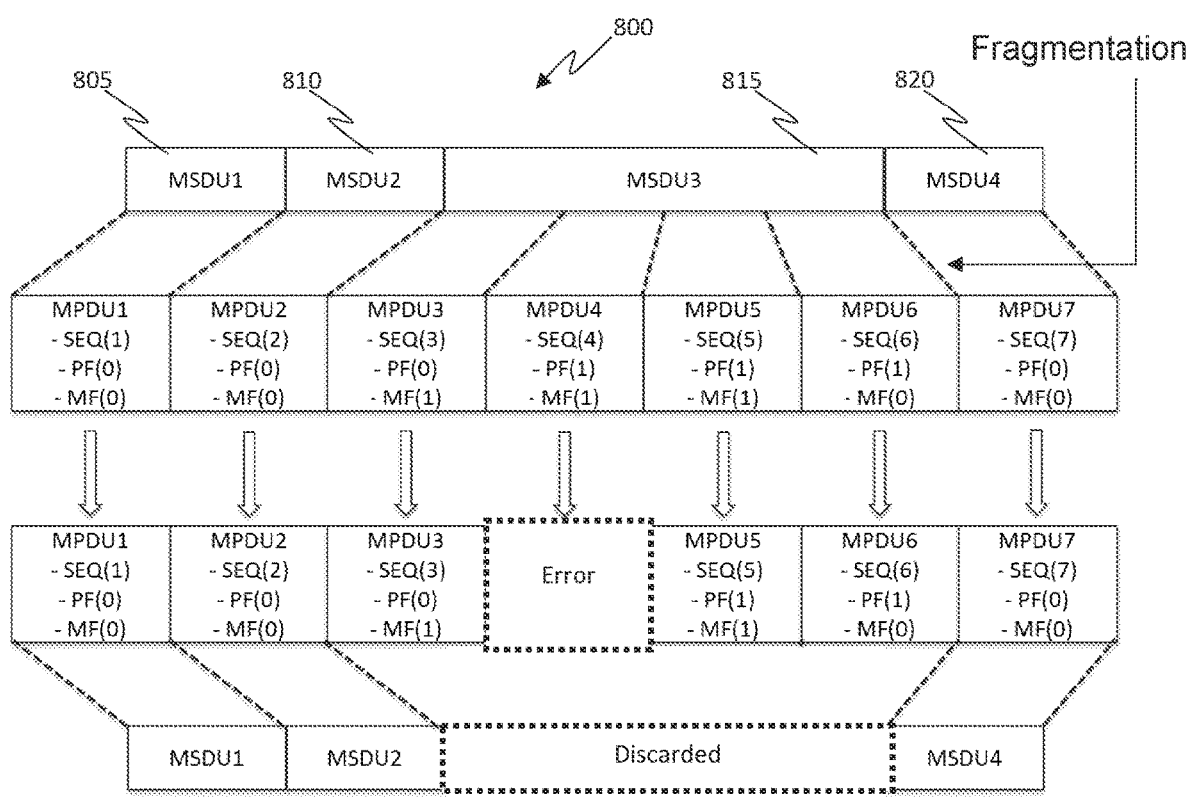
FIG. 8 is a block diagram of an exemplary wireless transmission using an extended sequence control field to identify fragmented frames of fragmented MSDUs and positions thereof where a middle fragmented frame is received with error according to embodiments of the present invention.

In the example of FIG. 8, MSDU1 805, MSDU2 810, MSDU3 815, and MSDU4 820 are transmitted from an EHT wireless STA to a peer EHT wireless STA. MSDU3 815 is fragmented and carried in MPDU3, MPDU4, MPDU5, and MPDU6. The peer EHT wireless device cannot defragment MSDU3 815 because a middle fragmented frame (MPDU4) is not successfully received. Accordingly, all fragments of MSDU3 are discarded by the peer EHT wireless STA.

Figure 9:
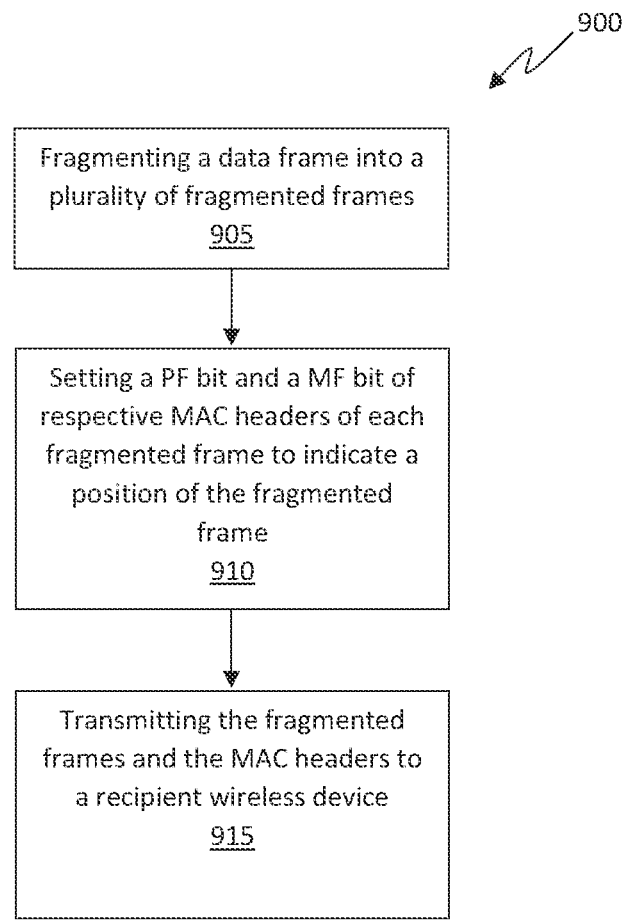
FIG. 9 is a flow chart depicting an exemplary sequence of steps of a computer implemented method of identifying and signaling fragmented frames using an extended sequence control field according to embodiments of the present invention.

FIG. 9 depicts an exemplary sequence of computer-implemented steps of a process 900 for transmitting fragmented frames (MSDUs) using an extended Sequence Control field according to embodiments of the present invention.

At step 905, a data frame (e.g., an MPDU) is fragmented into fragmented frames (e.g., fragmented MSDUs).

At step 910, a preceding fragments (PF) bit and a more fragments (MF) bit of MAC headers of the fragmented frames are set to indicate a position of each fragmented frame. For example, the frames can include a first fragmented frame, one or more middle fragmented frames, and a last fragmented frame, and these positions can be indicated according to the PF bit and MF bit values (see Table 1). The PF bit can be carried in a Sequence Control field of the MAC header. The order of fragmented frames can further be determined based on the Sequence Number subfield of the Sequence Control field.

At step 915, the fragmented frames and the MAC headers are transmitted to a recipient wireless device. The fragmented frames can be carried in MPDUs or an A-MPDU, for example.

Figure 10:
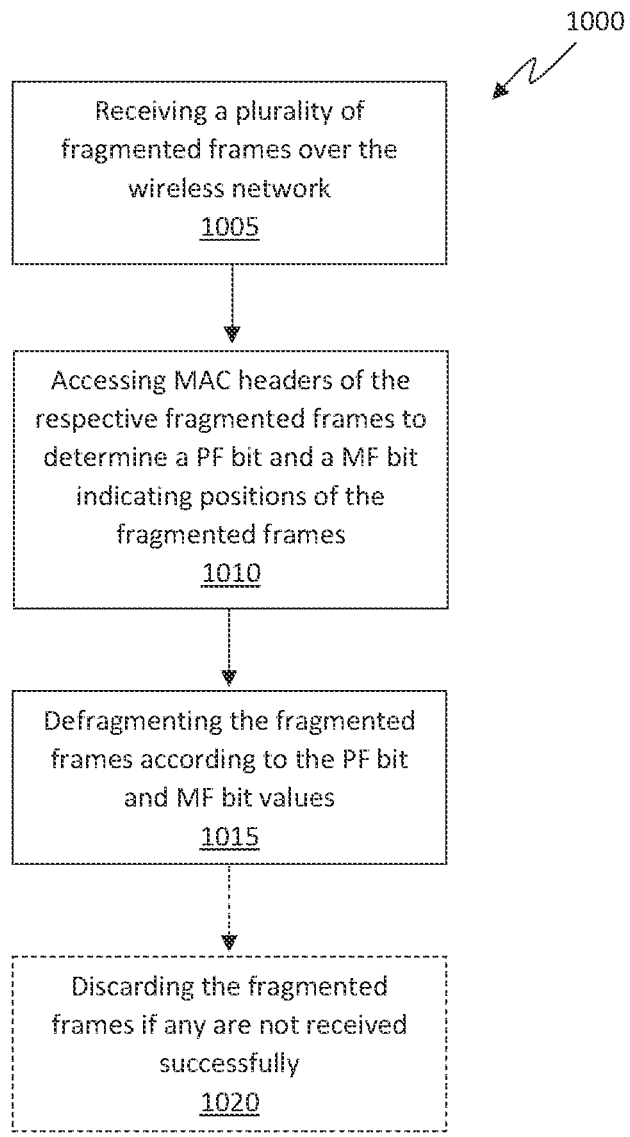
FIG. 10 is a flow chart depicting an exemplary sequence of steps a computer implemented method of decrypting fragmented frames using an extended sequence control field according to embodiments of the present invention.

FIG. 10 depicts an exemplary sequence of computer-implemented steps of a process 1000 for receiving and defragmenting fragmented frames (MPDUs) using an extended Sequence Control field according to embodiments of the present invention.

At step 1005, a plurality of fragmented frames (e.g., MSDUs) are received over a wireless network.

At step 1010, MAC headers of the respective fragmented frames are accessed to determine values of a PF bit and a MF bit used to indicate positions of the fragmented frames. For example, the PF bit and MF bits can be used to identify the position of a fragmented frame, such as a first fragmented frame, a middle fragmented frame, and a last fragmented frame.

At step 1015, the fragmented frames are defragmented according to the PF bit and MF bit values. The defragmenting can reproduce an MSDU and the MSDU can belong to an A-MSDU. The PF bit can be carried in a Sequence Control field of the MAC header. The order of fragmented frames can further be determined based on the Sequence Number subfield of the Sequence Control field.

At step 1020, the fragmented frames are optionally discarded if any of the fragmented frames are not received successfully.

Figure 11:
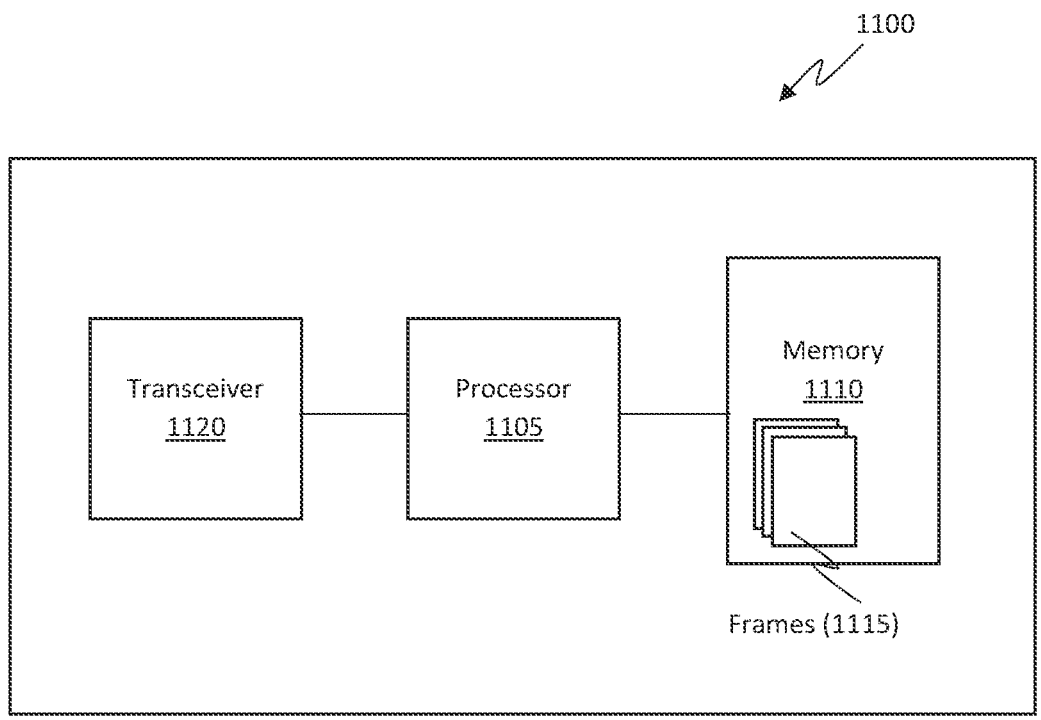
FIG. 11 is a block diagram of an exemplary computer system upon which embodiments of the present invention can be implemented.

FIG. 11 depicts an exemplary wireless device 1100 upon which embodiments of the present invention can be implemented. The wireless device 1100 can be a mobile electronic device, a wireless AP, a wireless STA, or any suitable computer system, for example. The wireless device 1100 includes a processor 1105 for running software applications and optionally an operating system. Memory 1110 can include read-only memory and/or random access memory, for example, to store applications and data for use by the processor 1105, as well as frames 1115 (e.g., data frames) that are received or transmitted by transceiver 1120. Transceiver 1120 is used to communicate with other electronic devices over a wireless network (e.g., WLAN) and typically operates according to IEEE standards (e.g., IEEE 802.11ax, IEEE 802.11ay, IEEE 802.11be, etc.).

According to embodiment of the present invention, the processor can execute instructions to performed computer-implemented processes for transmitting fragmented frames using a sequence control field in a MAC header that includes an extended 15-bit sequence number for tracking the order of frames and a 1-bit PF field that indicates the position of a fragmented frame in conjunction with a 1-bit MF field carried in a frame control subfield of the MAC header. The fragmented frames can be received by a wireless device and defragmented according to the MF field, the PF field, and, the Sequence Control number.

Embodiments of the present invention are thus described. While the present invention has been described in particular embodiments, it should be appreciated that the present invention should not be construed as limited by such embodiments, but rather construed according to the following claims.

What is claimed is:

1. A method of transmitting fragmented frames by a transmitting device, the method comprising:
  fragmenting a data frame into a plurality of fragmented frames, the plurality of fragmented frames comprising a first fragmented frame, a middle fragmented frame, and a last fragmented frame;
  setting a preceding fragments (PF) bit and a more fragments (MF) bit of respective MAC headers of each fragmented frame of the plurality of fragmented frames to indicate a respective position of each fragmented frame, wherein the MAC headers comprise a 15-bit sequence number (SEQ) for identifying a respective fragmented frame, wherein setting the PF bit to 1 indicates the existence of a preceding fragmented frame;
  setting the PF bit and the MF bit to indicate an absence of fragmented frames; and
  transmitting the first fragmented frame, the middle fragmented frame, and the last fragmented frame and the MAC headers for receipt by a recipient wireless device, wherein the first fragmented frame, the middle fragmented frame, and the last fragmented frame are comprised in an aggregate MAC Protocol Data Unit (A-MPDU).

2. The method of claim 1, further comprising the recipient wireless device defragmenting the plurality of fragmented frames, and wherein the PF bits and the MF bits are used to determine positions of respective fragmented frames.

3. The method of claim 1, wherein the setting comprises setting the MF bit to 1 to indicate the existence of a subsequent fragmented frame.

4. The method of claim 1, wherein the setting comprises setting both the PF bit to 1 and the MF bit to 1 to indicate that the respective fragmented frame is a middle fragmented frame.

5. The method of claim 1, wherein the MF bit is carried in a frame control field of the MAC header.

6. The method of claim 1, wherein the fragmented frames are defragmented at the recipient wireless device to produce an MSDU.

7. An apparatus for transmitting fragmented frames to a receiving device over a wireless network, the apparatus comprising:
   a transceiver configured to send and receive data over the wireless network; and
   a processor operable to:
      fragment a data frame into a plurality of fragmented frames, the plurality of fragmented frames comprising a first fragmented frame, a middle fragmented frame, and a last fragmented frame;
      set a preceding fragments (PF) bit and more fragments (MF) bit of respective MAC headers of each fragmented frame of the plurality of fragmented frames to indicate a respective position of each fragmented frame, wherein the MAC headers comprise a 15-bit sequence number (SEQ) for identifying a respective fragmented frame, and wherein setting the PF bit to 1 indicates the existence of a preceding fragmented frame;
      set the PF bit and the MF bit to indicate an absence of fragmented frames; and
         cause the transceiver to transmit the first fragmented frame, the middle fragmented frame, and the last fragmented frame and the MAC headers for receipt by a recipient wireless device, wherein the first fragmented frame, the middle fragmented frame, and the last fragmented frame are comprised in an aggregate MAC Protocol Data Unit (A-MPDU).

8. The apparatus of claim 7, wherein the recipient wireless device defragments the plurality of fragmented frames, and wherein the PF bits and the MF bits are used to determine positions of respective fragmented frames.

9. The apparatus of claim 7, wherein the processor is further operable to set the MF bit to 1 to indicate the existence of a subsequent fragmented frame.

10. The apparatus of claim 7, wherein the processor is further operable to set both the PF bit to 1 and the MF bit to 1 to indicate that the respective fragmented frame is a middle fragmented frame.

11. A method of defragmenting a fragmented MSDU in a wireless network, said method comprising:
   receiving a plurality of fragmented frames over the wireless network, the plurality of fragmented frames comprising a first fragmented frame, a middle fragmented frame, and a last fragmented frame;
   accessing MAC headers of the respective fragmented frames to determine a preceding frames (PF) bit and a more frames (MF) bit, wherein the MAC headers comprise a 15-bit sequence number (SEQ) for identifying a respective fragmented frame, and wherein setting the PF bit to 1 indicates the existence of a preceding fragmented frame; and
   defragmenting the fragmented frames according to the PF bit and MF bit values, wherein the PF bit and MF bit values indicate a respective position of a respective fragmented frame of the plurality of fragmented frames, and setting the PF bit and the MF bit to indicate an absence of fragmented frames, wherein the first fragmented frame, the middle fragmented frame, and the last fragmented frame are comprised in an aggregate MAC Protocol Data Unit (A-MPDU).

12. The method of claim 11, further comprising:
   determining that at least one of the plurality of fragmented frames is received with error; and
   discarding the plurality of fragmented frames.

\* \* \* \* \*